United States Patent [19]
Kim

[11] Patent Number: 6,002,500
[45] Date of Patent: Dec. 14, 1999

[54] HOLOGRAPHIC SCREEN INCLUDING CONVEX PROTRUSIONS

[75] Inventor: Yong-Ki Kim, Suwon, Rep. of Korea

[73] Assignee: Samsung Electronics Co., Ltd., Rep. of Korea

[21] Appl. No.: 08/855,643

[22] Filed: May 13, 1997

[30] Foreign Application Priority Data

May 13, 1996 [KR] Rep. of Korea ............. 96-15851

[51] Int. Cl.⁶ .................... G02B 5/32; G03B 21/60
[52] U.S. Cl. .................... 359/15; 359/453; 359/455; 359/456; 359/457; 359/452
[58] Field of Search ................ 359/15, 452, 453, 359/455, 456, 457, 460

[56] References Cited

U.S. PATENT DOCUMENTS

| | | | |
|---|---|---|---|
| 4,960,314 | 10/1990 | Smith et al. | 359/15 |
| 4,979,801 | 12/1990 | Park | 359/453 |
| 5,365,354 | 11/1994 | Jannson et al. | 359/15 |
| 5,473,454 | 12/1995 | Blanchard | 359/452 |
| 5,513,037 | 4/1996 | Yoshida et al. | 359/457 |
| 5,615,045 | 3/1997 | Takuma et al. | 359/456 |

FOREIGN PATENT DOCUMENTS

| | | | |
|---|---|---|---|
| 0 706 077 A1 | 10/1996 | European Pat. Off. | G03B 21/62 |
| WO 9670953A1 | 3/1996 | WIPO | G03B 21/62 |

Primary Examiner—Cassandra Spyrou
Assistant Examiner—Audrey Chang
Attorney, Agent, or Firm—Sughrue, Mion, Zinn, Macpeak & Seas, PLLC

[57] ABSTRACT

A holographic screen of a rear projection type for use in a projector for transmitting projection light received from a rear end of the projector onto a viewing surface. The holographic screen includes a holographic sheet including a viewing surface for forming the received projection light into an image viewing, a plurality of diffusion protrusions disposed on the viewing surface in predetermined intervals along horizontal and vertical directions of the viewing surface for diffusing incident projection light, and a plurality of scattering protrusions formed over the entire viewing surface for scattering the received projection light, and a plurality of light absorbers formed between the plurality of protrusions, for absorbing ambient light incident to the viewing surface. Thus, an image with improved contrast is displayed on a viewing surface of the holographic screen.

12 Claims, 1 Drawing Sheet

HOLOGRAPHIC SCREEN INCLUDING CONVEX PROTRUSIONS

BACKGROUND OF THE INVENTION

The present invention relates to a holographic screen for use in, for example, a rear projection screen. More particularly, the present invention is directed to a holographic screen including convex protrusions having light diffusion and/or light scattering functions.

A conventional rear projection screen contains a diffusion material, and commonly use a lenticular lens and a Fresnel lens. However, such a lenticular-Fresnel screen has a narrow angle of view and limited luminescence. A holographic screen has been proposed, as a result of research that has been conducted in the development of a screen that overcomes these problems.

Since holographic screens are manufactured easily once a master is fabricated and the features of the screen can be adjusted freely, holographic screens have become popular for use in rear projection screens.

FIG. 1 is a perspective view showing part of a conventional holographic screen including convex protrusions having light diffusion and/or light scattering functions.

The holographic screen can be made in a variety of shapes, and primarily includes a Fresnel lens sheet 2 and a holographic sheet 4. The holographic screen is made of a polymer of a transparent acryl-group such as acryl and polymethylmetacrylate (PMMA). Projection light incident from a light source (not shown) is incident to the surface of the Fresnel lens sheet 2. The Fresnel lens sheet 2 has an uneven shape on the surface opposite the light source, which varies a focal point of projection light incident from the light source. Thus, the projection light transmitting the Fresnel lens sheet 2 has a substantially uniform light characteristic on the surface of the screen.

The projection light passed through the Fresnel lens sheet 2 is incident to the holographic sheet 4. The holographic sheet 4 is formed on the viewing surface of the holographic screen, and includes a plurality of diffusion protrusions 6 and a plurality of scattering protrusions 8 which protrude from the viewing surface of the screen. The diffusion protrusions 6 are disposed in predetermined intervals along the horizontal and vertical directions on the surface of the holographic sheet 4. The scattering protrusions 8 are formed over the entire viewing surface of the holographic sheet 4 that includes the diffusion protrusions 6. Respective scattering protrusions 8 have a minute size compared with each of the diffusion protrusions 6. The light incident from the Fresnel lens sheet 2 to the holographic sheet 4 is diffused by the diffusion protrusions 6 and is scattered by the scattering protrusions 8. Most of the light incident to the holographic sheet 4 projects onto the viewing surface via the diffusion protrusions 6. The diffusion protrusions 6 and the scattering protrusions 8 formed on the diffusion protrusions 6 form an image to be viewed by the light passing through themselves. Thus, an area which has no diffusion protrusions 6 becomes dead space with regard to an actual image to be viewed.

When light is incident to the viewing surface of the holographic screen from the surrounding area, the received ambient light causes irregular reflection on the viewing surface of the holographic screen, thereby lowering the contrast of an image.

SUMMARY OF THE INVENTION

To solve the above problem, it is an object of the present invention to provide a holographic screen providing a good image quality by improving its contrast.

To accomplish the above and other objects of the present invention, a holographic screen of a rear projection type is provided for use in a projector for transmitting projection light received from a rear end of the projector onto a viewing surface. The holographic screen includes a holographic sheet including a viewing surface for forming the received projection light into an image to be viewed, a plurality of diffusion protrusions which are disposed on the viewing surface in predetermined intervals along horizontal and vertical directions for diffusing incident projection light, and a plurality of scattering protrusions which are formed over the entire viewing surface for scattering the received projection light; and a plurality of light absorbers which are formed between the plurality of diffusion protrusions, for absorbing ambient light incident to the viewing surface.

BRIEF DESCRIPTION OF THE DRAWINGS

The preferred embodiment is described with reference to the drawings wherein.

DETAILED DESCRIPTION OF THE PREFERRED EMBODIMENT

A preferred embodiment of the present invention will be described in detail with reference to the accompanying drawings.

Figure 1:
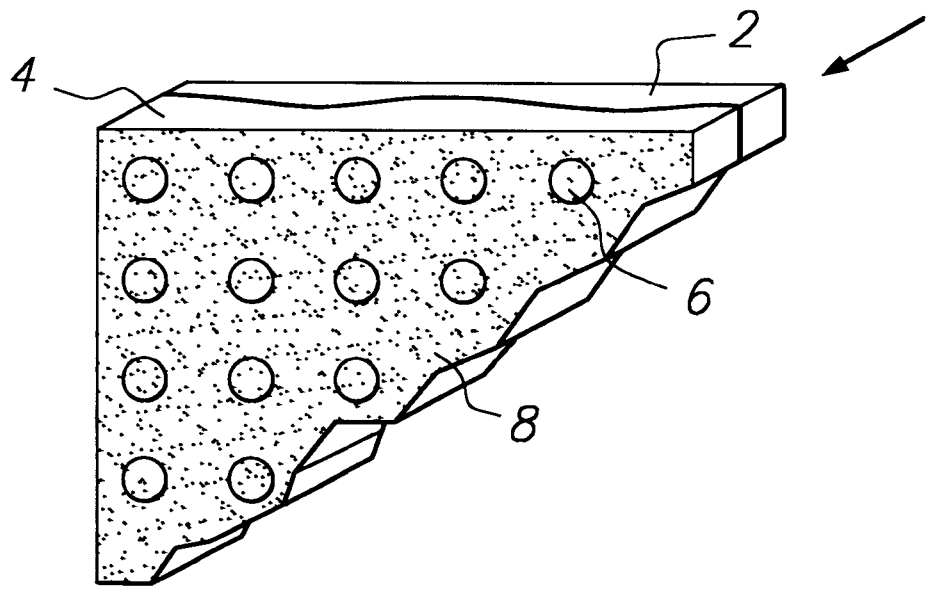
FIG. 1 is a perspective view showing part of a conventional holographic screen including convex protrusions having light diffusion and/or light scattering functions.
Figure 2:
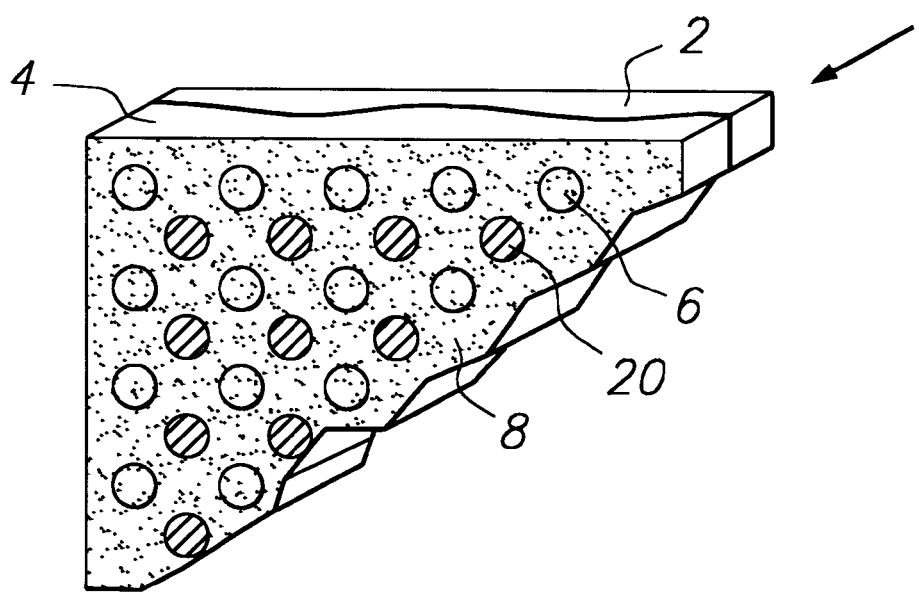
FIG. 2 is a perspective view showing part of a holographic screen including light absorbers according to a preferred embodiment of the present invention.

Referring to FIG. 2, a holographic screen according to the present invention includes a Fresnel lens sheet 2 and a holographic sheet 4 as shown in FIG. 1. The holographic sheet 4 includes a plurality of diffusion protrusions 6 and a plurality of scattering protrusions 8 on a viewing surface of the screen.

The holographic sheet 4 also includes a plurality of light absorbers 20 for absorbing ambient light incident to a viewing surface from an area outside of the screen. The light absorbers 20 are formed in central positions between four neighboring diffusion protrusions 6 and disposed in predetermined intervals along the horizontal and vertical directions of the screen.

The plurality of light absorbers 20 absorb the ambient light incident to the viewing surface from outside of the screen. Even though the light absorbers 20 absorb the ambient light, light loss does not result with regard to an image being formed on a screen. This is because that the area of the surface occupied by the light absorbers 20 is dead space with a small amount of projection light.

The light absorbers 20 are coated with a black material having a high rate of absorption of light. When a dark scene is displayed on the holographic screen, the light absorbers 20 provides a high dark effect. This results in improving the contrast of the image.

The holographic screen according to the above-described embodiment includes the Fresnel lens sheet 2 and the holographic sheet 4. Since a holographic sheet 4 can be fabricated so that light projected from a light source advances to a particular direction, a holographic screen according to the present invention can be manufactured using only a holographic sheet 4.

As described above, the holographic screen according to the present invention provides an effect for improving the contrast of an image to be viewed on a viewing surface.

While only certain embodiments of the invention have been specifically described herein, it will apparent that numerous modifications may be made thereto without departing from the spirit and scope of the invention.

What is claimed is:

1. A holographic screen for use in a projector for transmitting projection light received from a rear end of the projector onto a viewing surface, said holographic screen comprising:

a sheet comprising a viewing surface for forming projection light into an image for viewing, a plurality of diffusion protrusions disposed on the viewing surface in predetermined intervals along horizontal and vertical directions of the viewing surface for diffusing incident projection light, a plurality of scattering protrusions formed over the viewing surface, including the plurality of diffusion protrusions disposed thereon, for scattering the received projection light, and a plurality of light absorbers disposed on the viewing surface, for absorbing ambient light incident to said viewing surface, wherein all of said plurality of light absorbers are disposed discretely from each other and each of said plurality of light absorbers is located between four neighboring diffusion protrusions.

2. The holographic screen according to claim 1, wherein said plurality of light absorbers are disposed in predetermined intervals along horizontal and vertical directions of said viewing surface.

3. The holographic screen according to claim 1, wherein each of said plurality of light absorbers is located centrally between said four neighboring diffusion protrusions.

4. The holographic screen according to claim 1, wherein said respective light absorbers are substantially circular in shape.

5. The holographic screen according to claim 1, wherein said plurality of light absorbers are coated materials with a predetermined color.

6. The holographic screen according to claim 1, further comprising a Fresnel lens sheet which uniformly converges the projection light from the rear end of the projector onto the incident surface of said sheet.

7. A rear projector comprising a holographic screen for use for transmitting projection light received from a rear end of the projector onto a viewing surface, said holographic screen comprising:

a sheet comprising a viewing surface for forming projection light into an image for viewing, a plurality of diffusion protrusions disposed on the viewing surface in predetermined intervals along horizontal and vertical directions of the viewing surface for diffusing incident projection light, a plurality of scattering protrusions formed over the viewing surface, including the plurality of diffusion protrusions disposed thereon, for scattering the received projection light, and a plurality of light absorbers disposed on the viewing surface, for absorbing ambient light incident to said viewing surface, wherein all of said plurality of light absorbers are disposed discretely from each other and each of said plurality of light absorbers is located between four neighboring diffusion protrusions.

8. A holographic screen for transmitting light onto a viewing surface comprising:

a sheet comprising a viewing surface for forming light into a viewable image, a plurality of diffusion protrusions disposed on the viewing surface in predetermined intervals along horizontal and vertical directions of the viewing surface for diffusing incident light, and a plurality of scattering protrusions formed over the viewing surface, including the plurality of diffusion protrusions disposed thereon, for scattering the received light, and a plurality of light absorbers disposed on the viewing surface, for absorbing ambient light incident to said viewing surface, wherein all of said plurality of light absorbers are disposed discretely from each other and each of said plurality of light absorbers is located between four neighboring diffusion protrusions.

9. The holographic screen according to claim 8, wherein said plurality of light absorbers are disposed in predetermined intervals along horizontal and vertical directions of said viewing surface.

10. The holographic screen according to claim 8, wherein each of said plurality of light absorbers is located centrally between said four neighboring diffusion protrusions.

11. The holographic screen according to claim 8, wherein said respective light absorbers are substantially circular in shape.

12. The holographic screen according to claim 8, wherein said plurality of light absorbers are coated materials with a predetermined color.

* * * * *